United States Patent
Matsushita (10) Patent No.: US 8,437,023 B2
(45) Date of Patent: May 7, 2013

(54) IMAGE PROCESSING APPARATUS, METHOD FOR IMAGE PROCESSING, AND COMPUTER READABLE MEDIUM FOR EXECUTING VARIOUS PROCESSING PREVIOUSLY REGISTERED

(75) Inventor: Kyoko Matsushita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 898 days.

(21) Appl. No.: 12/546,389

(22) Filed: Aug. 24, 2009

(65) Prior Publication Data

US 2010/0202011 A1 Aug. 12, 2010

(30) Foreign Application Priority Data

Feb. 10, 2009 (JP) ................................. 2009-028489

(51) Int. Cl.
| | |
|---|---|
| G06K 15/00 | (2006.01) |
| G06K 9/34 | (2006.01) |
| G06K 9/18 | (2006.01) |
| H04N 1/40 | (2006.01) |
| H04N 1/00 | (2006.01) |

(52) U.S. Cl.
USPC ....... 358/1.15; 358/1.14; 358/1.16; 358/3.21; 358/404; 358/448; 382/175; 382/176; 382/186

(58) Field of Classification Search ................ 358/1.15, 358/1.14, 1.16, 3.21, 521, 464, 300, 302, 358/401, 404, 444, 468, 437, 448, 466, 465, 358/518, 447, 445; 399/354, 82, 6, 16, 17, 399/31, 39, 75, 83; 382/175, 186, 184, 176, 382/205, 270, 274

See application file for complete search history.

(56) References Cited

U.S. PATENT DOCUMENTS

| | | | | |
|---|---|---|---|---|
| 5,724,154 | A * | 3/1998 | Ito et al. ...................... | 358/400 |
| 2004/0125389 | A1* | 7/2004 | Tokura et al. ................. | 358/1.9 |
| 2005/0094200 | A1* | 5/2005 | Uekusa et al. ................ | 358/1.15 |
| 2005/0204145 | A1* | 9/2005 | Makishima .................... | 713/182 |
| 2007/0064257 | A1* | 3/2007 | Inoue et al. .................. | 358/1.14 |
| 2007/0091381 | A1* | 4/2007 | Sato ............................. | 358/448 |
| 2008/0062463 | A1* | 3/2008 | Sato ............................. | 358/1.16 |

FOREIGN PATENT DOCUMENTS

| | | |
|---|---|---|
| JP | 11-331446 A | 11/1999 |
| JP | 2006-067210 A | 3/2006 |

\* cited by examiner

*Primary Examiner* — Benny Q Tieu
*Assistant Examiner* — Ngon Nguyen
(74) *Attorney, Agent, or Firm* — Sughrue Mion, PLLC (57) ABSTRACT

An image processing apparatus is provided and includes: a memory that stores discrimination information and a setting value group associated with the discrimination information, the setting value group including a plurality of first setting values for carrying out processing and; a setting unit that sets second setting values needed for image processing, in which a portion of the first setting values in the setting value group associated with the discrimination information is set as at least a portion of the second setting values; and a processing unit that carries out image processing according to the second setting values.

6 Claims, 14 Drawing Sheets

| GROUP OF FUNCTIONS | PARAMETER | JOB MEMORY 1 | JOB MEMORY 2 | JOB MEMORY 3 |
|---|---|---|---|---|
| SETTING OF READING | COLOR MODE | FULL COLOR | AUTOMATIC | BLACK AND WHITE |
| | DOCUMENT SIZE | A4 | A3 | A4 |
| SETTING OF PRINTING | OUTPUT ON BOTH SIDES | ONE SIDE | ONE SIDE | BOTH SIDES |
| | PUNCH | PUNCHING (LEFT) | NOT PUNCHING | PUNCHING (RIGHT) |
| SETTING OF TRANSFER | FILE FORM | PDF | XPS | TIFF |

| GROUPS OF FUNCTIONS | PARAMETER | JOB MEMORY 1 | JOB MEMORY 2 | JOB MEMORY 3 |
|---|---|---|---|---|
| BASIC SETTING | COLOR MODE | FULL COLOR | AUTOMATIC | BLACK AND WHITE |
| | DOCUMENT SIZE | A4 | A3 | A4 |
| | OUTPUT ON BOTH SIDES | ONE SIDE | ONE SIDE | BOTH SIDES |
| | PUNCH | PUNCHING (LEFT) | NOT PUNCHING | PUNCHING (RIGHT) |
| COMPILATION SETTING | COMPOSITE PRINTING | PRINTING | NOT PRINTING | NOT PRINTING |
| | GUARD SHEET INSERTION | NOT INSERTION | INSERTION | NOT INSERTION |

FIG. 14

IMAGE PROCESSING APPARATUS, METHOD FOR IMAGE PROCESSING, AND COMPUTER READABLE MEDIUM FOR EXECUTING VARIOUS PROCESSING PREVIOUSLY REGISTERED

CROSS-REFERENCE TO RELATED APPLICATION

This application is based on and claims priority under 35 USC §119 from Japanese Patent Application No. 2009-028489 filed Feb. 10, 2009.

BACKGROUND (i) Technical Field

The present invention relates to an image processing apparatus, a method for image processing, and a computer readable medium.

(ii) Related Art

In image forming apparatuses such as printers, image reading apparatuses such as scanners, image communication apparatuses such facsimile machines and other image processing apparatuses having the above and the other functions, some apparatuses are provided in which a setting value group needed at the time of executing various processing are previously registered and the thus registered setting value group are called up so that processing can be executed.

SUMMARY

According to an aspect of the invention, there is provided an image processing apparatus including:

a memory that stores discrimination information and a setting value group associated with the discrimination information, the setting value group including a plurality of first setting values for carrying out processing and;

a setting unit that sets second setting values needed for image processing, wherein a portion of the first setting values in the setting value group associated with the discrimination information is set as at least a portion of the second setting values; and a processing unit that carries out image processing according to the second setting values.

BRIEF DESCRIPTION OF THE DRAWINGS

Embodiments of the present invention will be described in detail based on the following figures, wherein.

DETAILED DESCRIPTION

Referring to the accompanying drawings, exemplary embodiments of an image processing apparatus, a method for image processing, and a computer readable medium storing a program for image processing according to the present invention will be explained below in detail.

Figure 1:
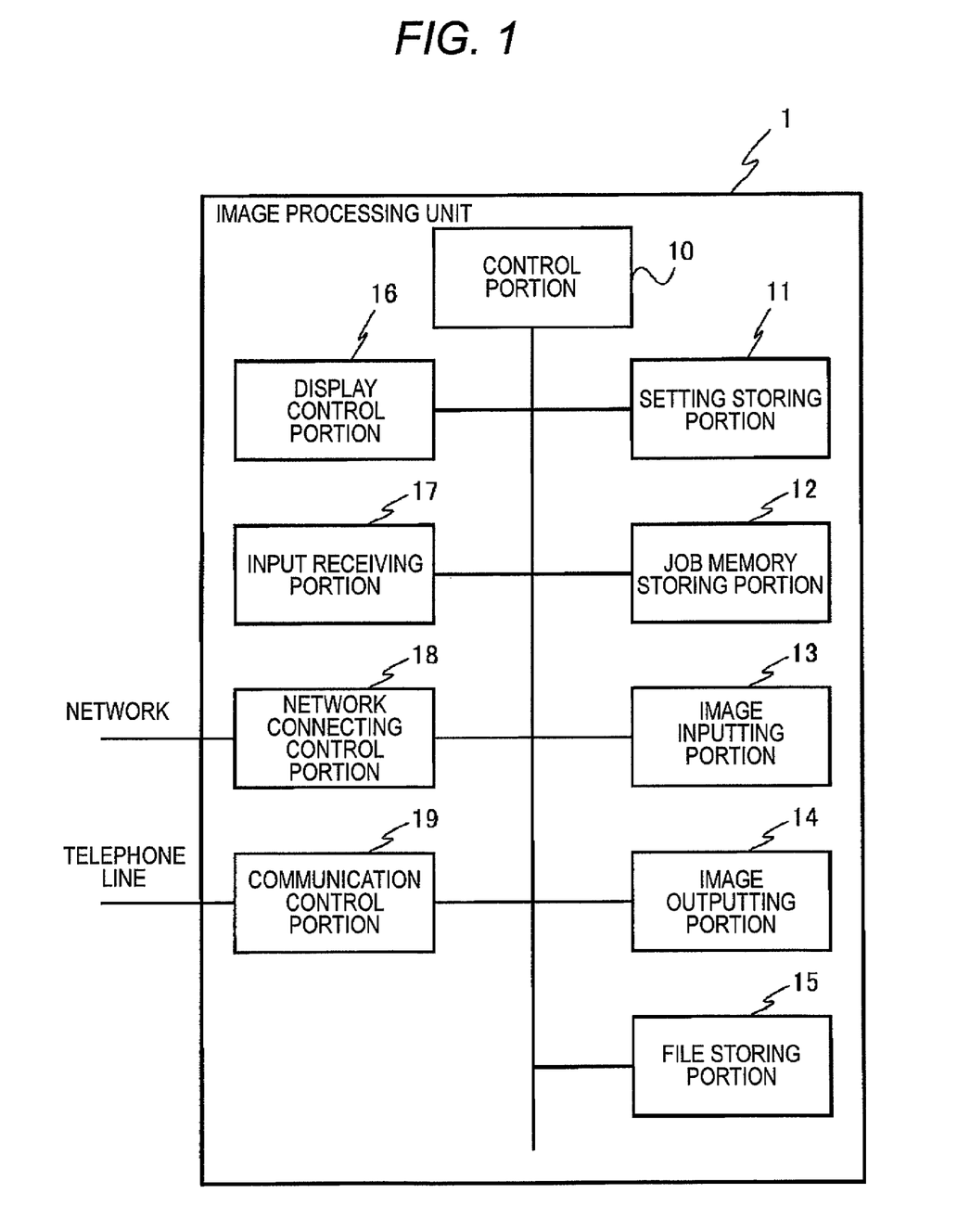
FIG. 1 is a view showing a constitution of an image processing apparatus according to an embodiment of the invention.

FIG. 1 is a view showing a constitution of an image processing apparatus according to an embodiment of the invention. The image processing apparatus 1 shown in FIG. 1 includes: a control portion 10, a setting storage portion 11, a job memory storage portion 12, an image inputting portion 13, an image outputting portion 14, a file storage portion 15, a display control portion 16, an image receiving portion 17, a network connecting control portion 18 and a communication control portion 19.

The control portion 10 controls each portion of the image processing apparatus 1 and makes the image processing apparatus 1 carry out various jobs. The setting storage portion 11 temporarily stores each setting value (parameter) used when the image processing apparatus 1 carries out a job. The job memory storage portion 12 stores at least one set of setting values as a job memory used when the image processing apparatus 1 carries out a job.

The image input portion 13 reads a document which is put on a document table not shown or on a document feeder and generates image data. The image output portion 14 executes a printing output of forming an image on a sheet of paper according to the image data. The file storage portion 15 stores various files of image data, which is generated by the image inputting portion 13, and also stores image data which has been inputted through a network.

The display control portion 16 makes the display unit such as a touch panel not shown display various information. The input receiving portion 17 receives a command and information inputted from the inputting unit such as a touch panel not shown. The network connection control unit 18 controls a connection with the network and sends or receives various files and further sends or receives the Internet Facsimile. The communication control portion 19 is connected to the telephone line and sends and receives a facsimile.

Figure 2:
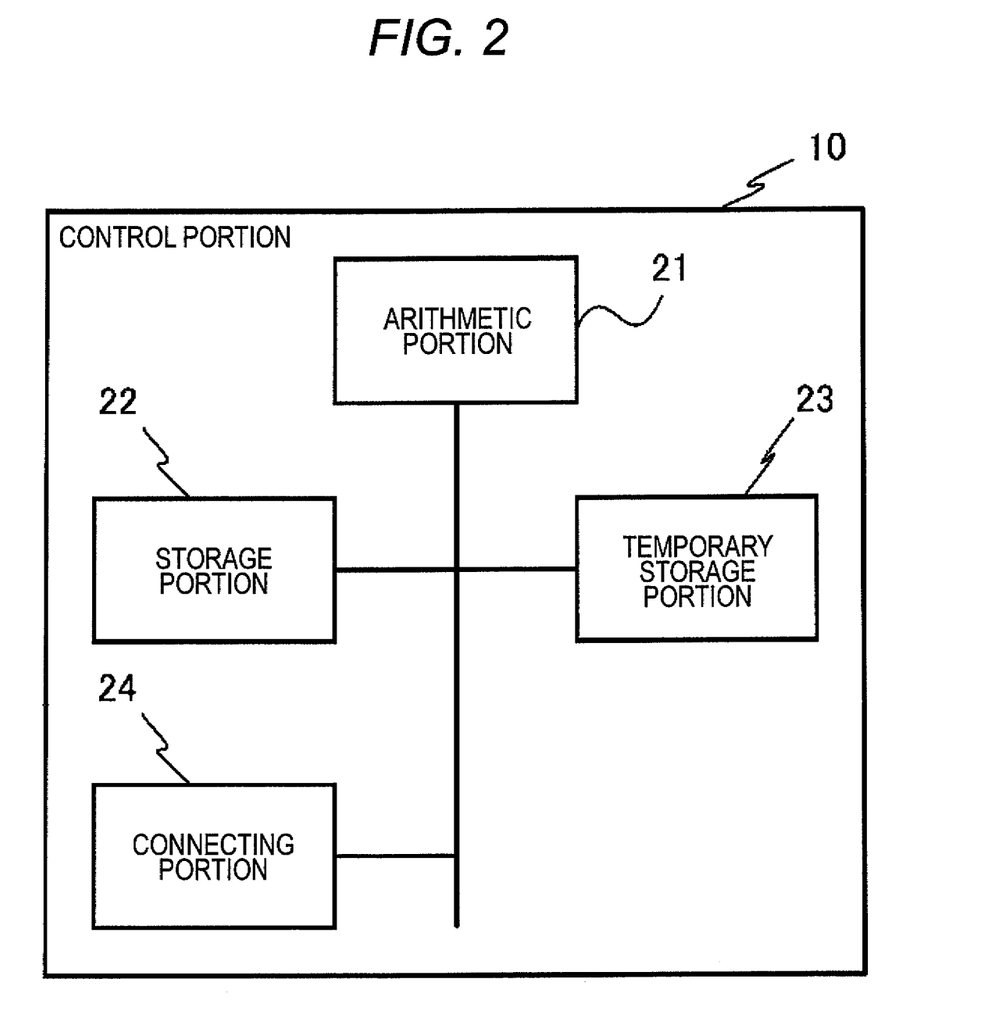
FIG. 2 is a view showing a constitution of a control portion in an image processing apparatus according to an embodiment of the invention.

The control portion 10 may have a constitution as shown in FIG. 2. FIG. 2 is a view showing a constitution of the control portion 10.

As shown in FIG. 2, the control portion 10 includes: an arithmetic portion 21, a storage portion 22, a temporarily storing portion 23 and a connecting portion 24.

The arithmetic portion 21 executes an arithmetic processing. For example, the arithmetic portion 21 can be realized by a processor such as CPU (Central Processing Unit). The storage portion 22 stores information and others. The storage portion 22 is realized by a memory such as ROM (Read Only Memory) or a nonvolatile memory. The temporarily storing portion 23 temporarily stores information and others. For example, the temporarily storing portion 23 is realized by a memory such as RAM (Random Access Memory). The connecting portion 24 is an interface for connecting the control portion 10 with other units shown in FIG. 1.

The control portion 10 makes the arithmetic portion 21 realize each function according to a program stored in the storage portion 22 and controls the image processing apparatus 1.

Here, the functional portion realized by the control portion 10 will be explained below. However, only the functional portion related to the job memory is explained here and the explanations of other functional portions will be omitted here.

Figure 3:
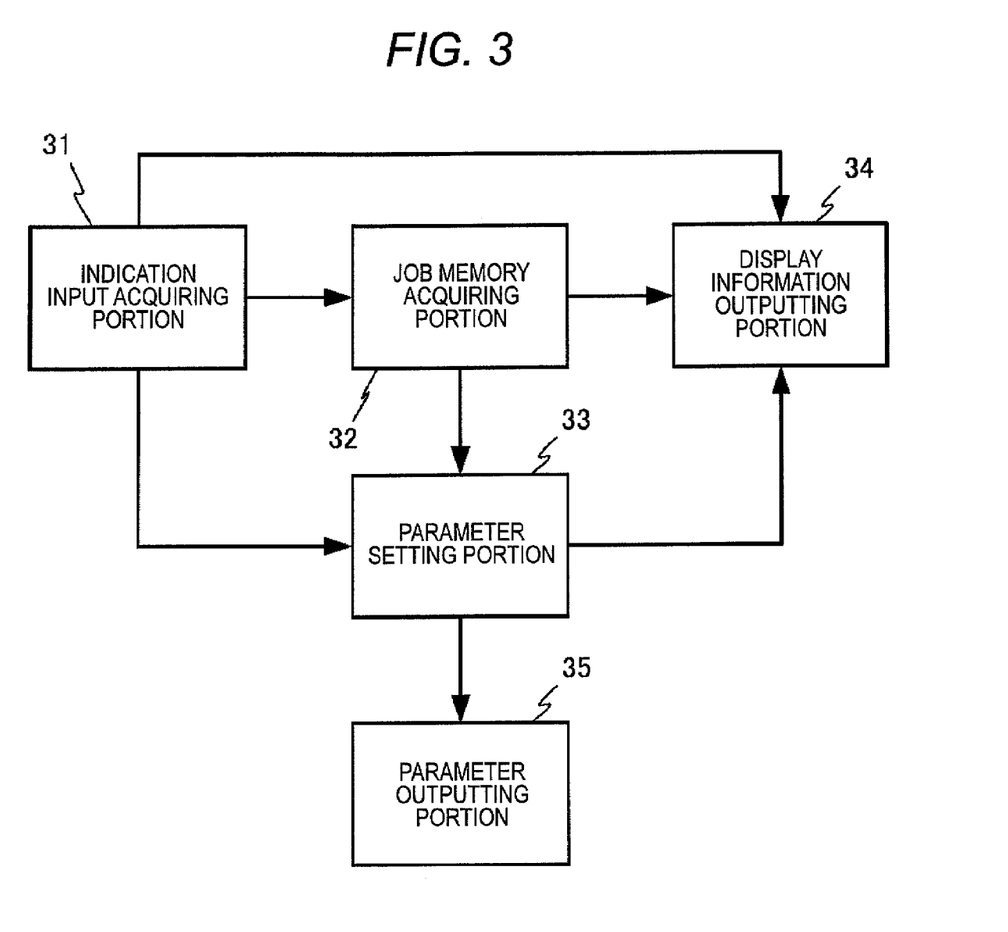
FIG. 3 is a block diagram showing a functional constitution of a control portion in an image processing apparatus according to an embodiment of the invention.

FIG. 3 is a block diagram showing a functional constitution of the control portion 10. In FIG. 3, the control portion 10 has functional portions including an indicating input acquiring portion 31, a job memory acquiring portion 32, a parameter setting portion 33, a display information outputting portion 34 and a parameter output portion 35.

The indicating input acquiring portion 31 acquires an indicating input related to the parameter setting in the indicating input received by the input receiving portion 17. The job memory acquiring portion 32 acquires a content (setting value) of the job memory concerned from the job memory storing portion 12 in the case where an indicating input acquired by the indicating input acquiring portion 31 needs an acquisition of the job memory. The parameter setting portion 33 sets a setting value according to the setting indication of the setting value acquired by the indicating input acquiring portion 31 and also according to the setting value of the job memory acquired by the job memory acquiring portion 32. The display information acquiring portion 34 outputs display information required when the display control portion 16 updates the display in the case where the job memory acquiring portion 32 acquires a list of the job memories or the parameter setting portion 33 changes the setting of the setting value. The parameter output portion 35 outputs a decided setting value to the setting storing portion 11 in the case where the setting value, which is set by the parameter setting portion 33, is decided.

Figure 4:
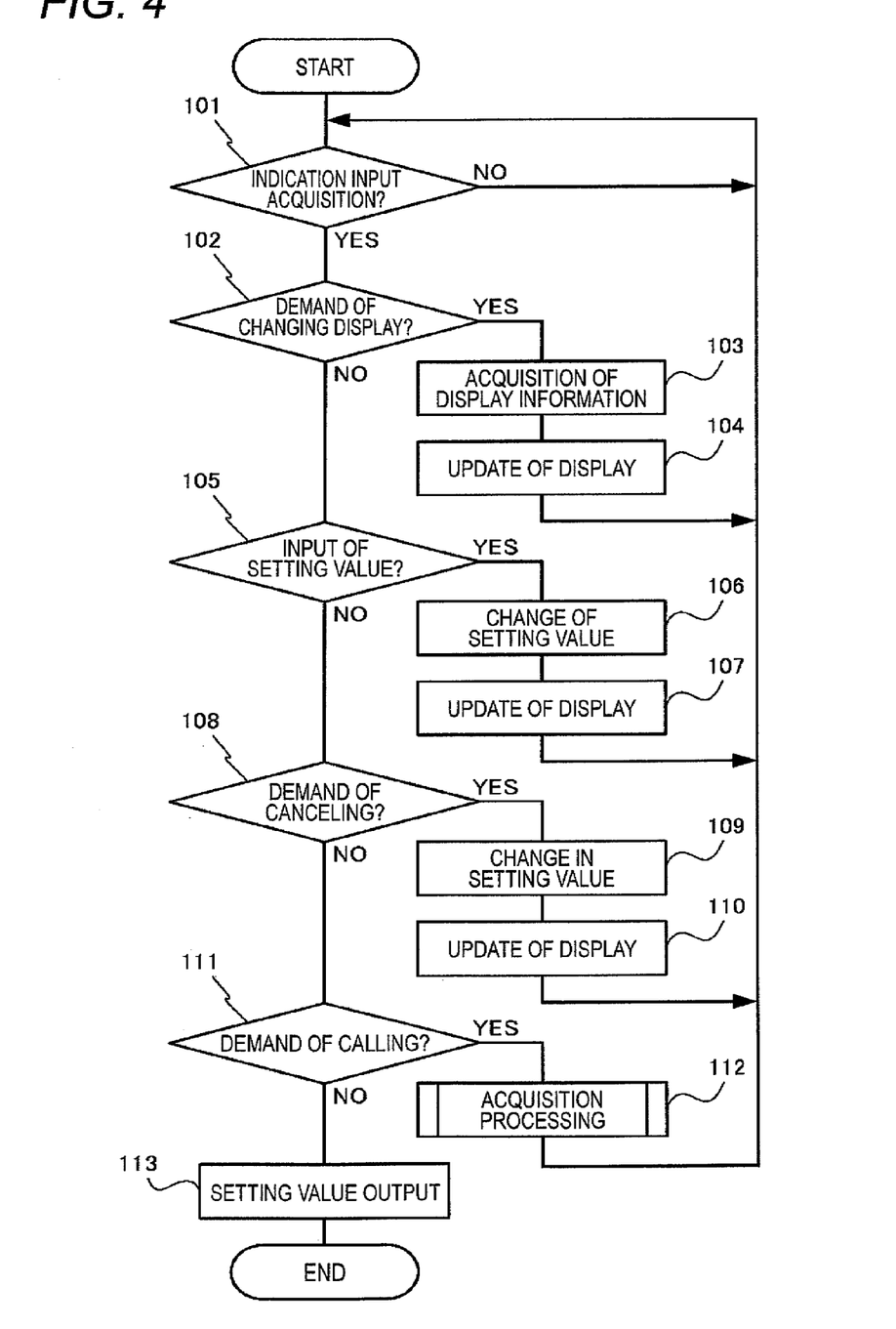
FIG. 4 is a flow chart showing a flow of a parameter setting processing according to an embodiment of the invention.

Next, explanations will be made into a flow of the parameter setting processing executed by the control portion 10. FIG. 4 is a flow chart showing a flow of a parameter setting processing.

In the parameter setting processing, the indicating input acquiring portion 31 acquires an indicating input (YES in step 101). In the case where the indicating input concerned is a demand for changing display information in the display (YES in step 102), display information is acquired (step 103) and the display information output portion 34 outputs the acquired display information and the display control portion 16 is made to update the display (step 104). In the case where only display information in an operating display is changed, the display information is only information that the display information output portion 34 possesses. In the case of the display of the list of the job memories, the job memory acquiring portion 32 acquires information of the job memory from the job memory storing portion 12, and in the case where the setting value set at present is displayed, the setting value which the parameter setting portion 33 possesses is acquired and the acquired setting value is made to be the display information together with the information which the display information outputting portion 34 possesses.

In the case where the indicating input acquired by the indicating input acquiring portion 31 is an input of the setting value (YES in step 101, NO in step 102, YES in step 105), the parameter setting portion 33 changes the setting value according to the indicating input (step 106) and the changed setting value and the information, which the display information outputting portion 34 possesses, are outputted from the display information outputting portion 34 as the display information, so that the display control portion 16 is made to update the display (step 107).

In the case where the indication input, which has been acquired by the indicating input acquiring portion 31, is a demand for canceling to input the setting value (YES in step 101, NO in step 102, NO in step 105 and YES in step 108), the parameter setting portion 33 changes the setting value to the original value according to the indicating input (step 109) and the display information outputting portion 34 outputs the changed setting value and the information, which the display information output portion 34 possesses, as the display information, so that the display control portion 16 is made to update the display (step 110).

In the case where the indication input acquired by the indication input acquiring portion 31 is a demand for calling up the job memory (YES in step 101, NO in step 102, NO in step 105, NO in step 108 and YES in step 111), the acquiring processing described later is executed (step 112).

In the case where the indication input acquired by the indication input acquiring portion 31 is none of the above cases (YES in step 101, NO in step 102, NO in step 105, NO in step 108 and NO in step 111) (In this case, only the decided demand of parameter setting does not come under any of the above case.), the parameter outputting portion 35 outputs the setting value, which is set in the parameter setting portion 33, to the setting storage portion 11 (step 113) and the parameter setting processing is finished.

Figure 5:
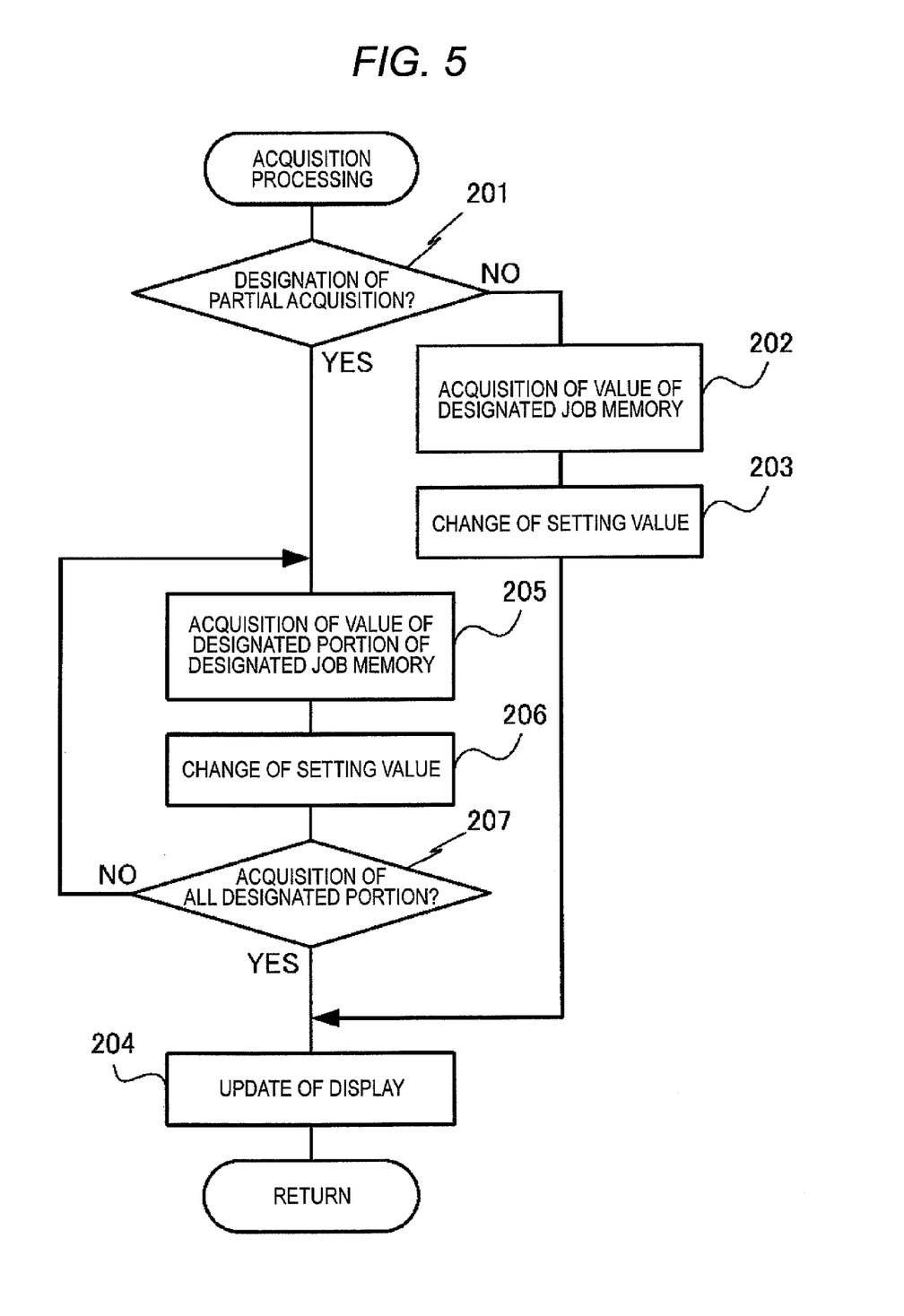
FIG. 5 is a flow chart showing a flow of a acquisition processing according to an embodiment of the invention.

Next, the acquiring processing executed in step 112 will be explained below. FIG. 5 is a flow chart showing a flow of an acquisition processing.

In the acquisition processing, in the case where the demand for calling up the job memory is a demand for calling up all the setting values of the job memory concerned (NO in step 201, the job memory acquiring portion 32 acquires all the setting values of the designated job memory (step 202). According to the acquired setting value, the parameter setting portion 33 changes the setting value (step 203). The display information outputting portion 34 outputs the thus changed setting value and the information, which the display information outputting portion 34 possesses, as the display information, so that the display control portion 16 is made to renew the display (step 204). In this way, the acquiring processing is finished.

On the other hand, in the case where the demand for calling up the job memory is a demand for calling a portion of the setting values of the job memory concerned (YES in step 201), the job memory acquiring portion 32 acquires the designated setting value of the designated job memory (step 205). The parameter setting portion 33 changes the setting value according to the acquired setting value (step 206). Then, the acquisition of the setting value and the change of the setting value are repeated with respect to all the designated job memories (NO in step 207). When the designated setting value is acquired from all the designated job memories (YES in step 207), the display information outputting portion 34 outputs the thus changed setting value and the information, which the display information outputting portion 34 possesses, as the display information, so that the display control portion 16 is made to renew the display (step 204). In this way, the acquiring processing is finished.

Explanations will be made into several specific examples of the processing for calling up a portion of the setting values of the job memory.

Figure 6:
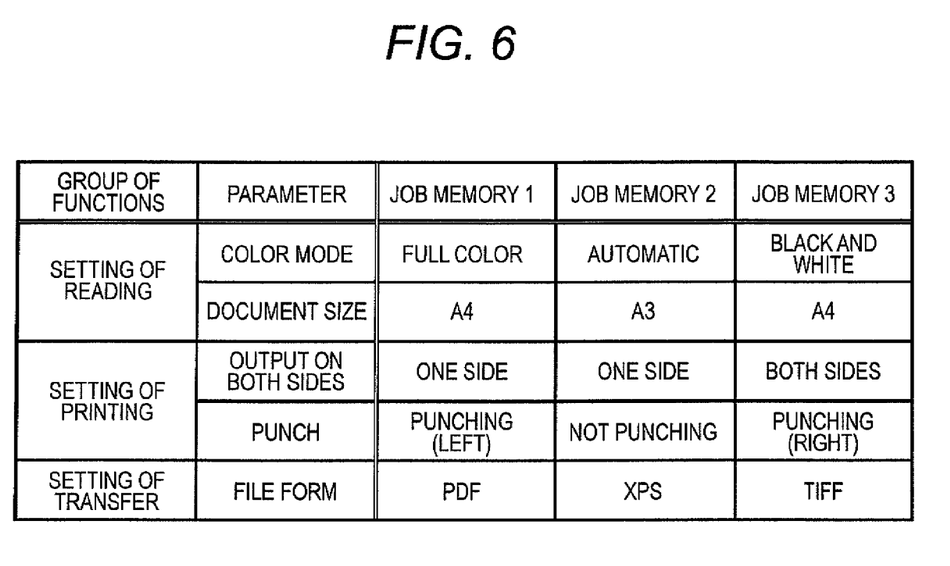
FIG. 6 is a view showing setting values of a registered job memory in an image processing apparatus according to an embodiment of the invention.

FIG. 6 is a view showing setting values of a registered job memory. In this embodiment, the setting values are classified by the processing function of the image processing apparatus and the job memory can be called up for each processing function. For example, the processing function of the image processing apparatus can be classified into the scanning function executed by the image inputting portion such as a scanner, the printing function executed by the image outputting portion such as a printer, and the transfer function executed by the network connecting control portion and by the communication control portion. In FIG. 6, in any of the job memories 1, 2 and 3, the setting values are registered with respect to the reading setting at the time of reading the document, the printing setting at the time of printing the image and the transfer setting at the time of transferring the file of the image.

Figure 7:
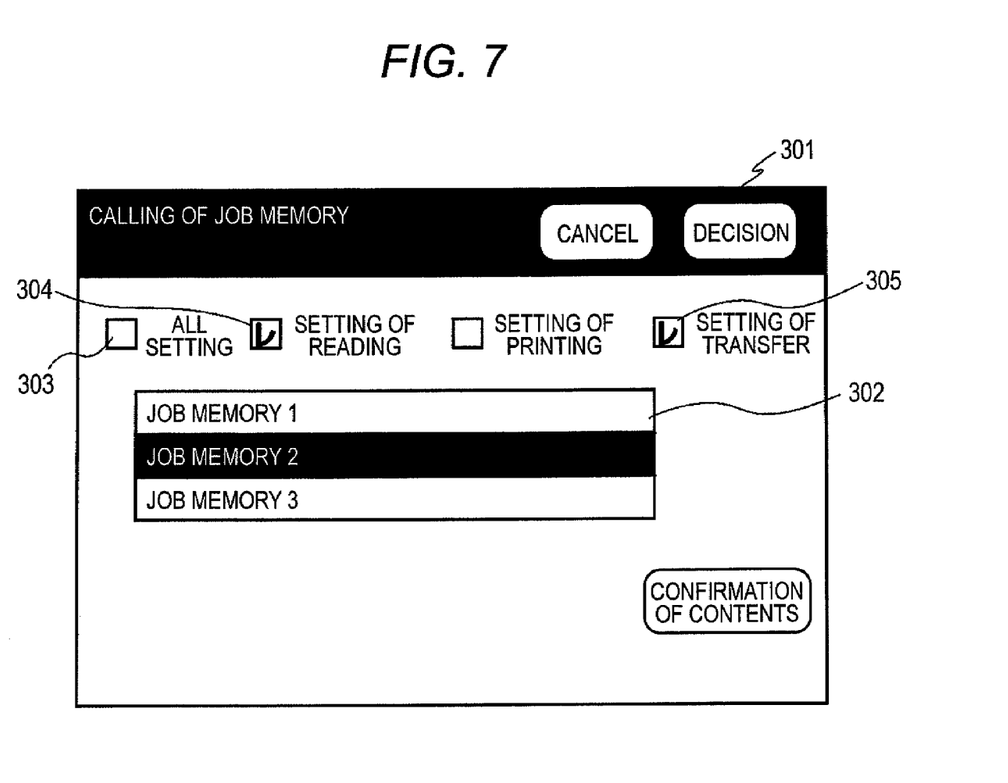
FIG. 7 is a view showing a setting display in an image processing apparatus according to an embodiment of the invention.

The image processing apparatus 1 shows, for example, the display 301 shown in FIG. 7 as an image plane for calling up the job memory. The display 301 shows: a job memory selecting column 302 for selecting the job memory which is an object to be called up; an overall designation column 303 for designating the calling of all the setting values of the job memory which is an object to be called up; a calling setting designation column 304 for designating the calling to call up only the reading setting which is a portion of the job memories selected in the job memory selecting column 302; and a transfer setting designation column 305 for designating the calling of only the transfer setting which is a portion of the job memories selected by the job memory selecting column 302.

On this display 301, the calling of all the setting values of the job memory is designated by the overall designation column 303. For example, when the job memory 2 is called up, all the setting values registered in the job memory 2 are called up. When the image processing apparatus 1 is operated under the above condition, the scanning function, the printing function and the transfer function are carried out according to the setting values which have been called up.

On the other hand, when the job memory 2 is called up by designating the calling of the reading setting in the reading setting designating column 304 on the display 301 and by designating the calling of the transfer setting in the transfer setting designating column 305, the reading setting and the transfer setting of the job memory 2 are called up. When the image processing apparatus 1 is operated under the above condition, the scanning function and the transfer function are carried out according to the setting values of the called reading setting and the transfer setting.

When the image processing is carried out after the setting of a portion of the processing function is called up, the setting value except for the setting condition called up may be appropriately set at a desired setting value. Alternatively, the called setting value may be adjusted and the image processing function may be carried out.

The way of calling is not limited to the above method in which the job memory to be called up is designated and the processing function is carried out according to the called setting value. It is possible to consider a method in which the processing to be carried out is selected and the setting value with respect to carrying out the processing is designated by the classification of the registered job memory.

An exemplary embodiment in the case of carrying out copying processing will be explained here.

Figure 8:
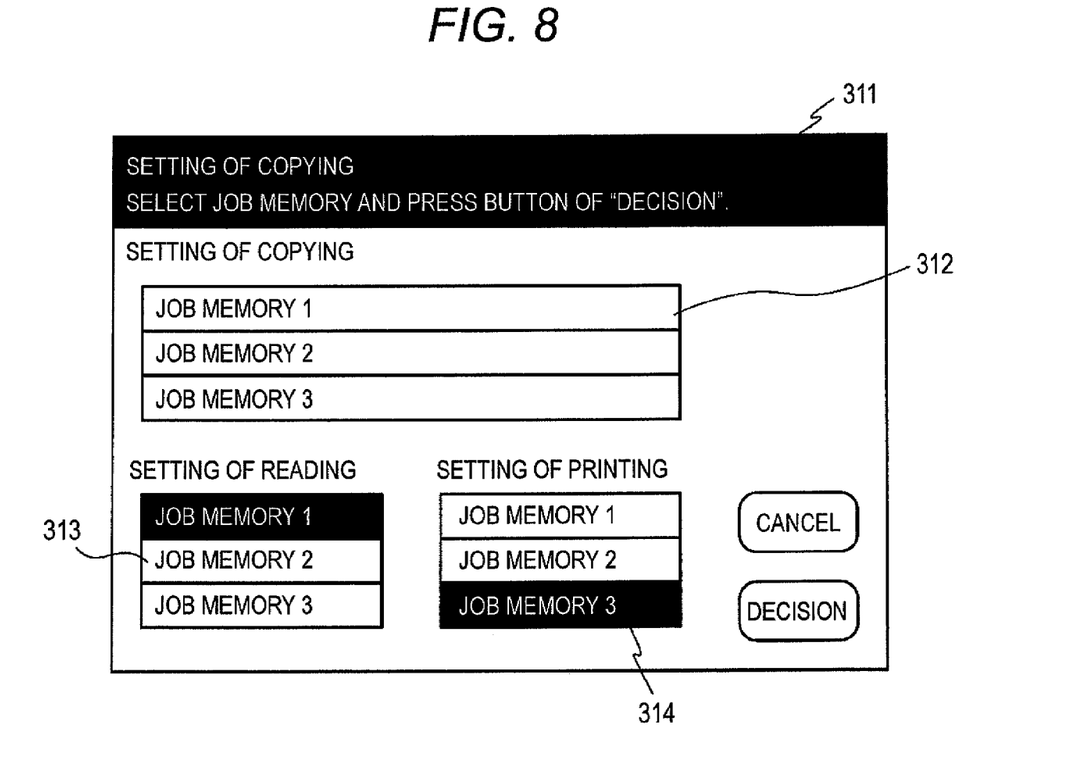
FIG. 8 is a view showing a setting display in an image processing apparatus according to an embodiment of the invention.

When the copying function is selected on a function selecting image plane not shown, the image processing apparatus 1 shows the display 311 shown in FIG. 8. The display 311 shows: a job memory selecting column 312 for selecting the job memory at the time of calling up the copying setting (the reading setting and the printing setting) in the job memories; a reading setting job memory selecting column 313 for selecting the job memory at the time of calling up the reading setting in the job memories; and a printing setting job memory selecting column 314 for selecting the job memory at the time of calling up the printing setting in the job memories.

On this display 311, when the job memory is selected and called up in the job memory selecting column 312, the setting value of the copying setting in the selected job memory is called up. For example, when the job memory 1 is selected and called up in the job memory selecting column 312, as the job memory for carrying out the copying processing, the setting value of "full color/A4", which is the reading setting of the job memory 1, and the setting value of "one side/left punch", which is the printing setting of the job memory 2, are called up as the setting values for executing copying operation. When the job memory is selected and called up in the reading setting job memory selecting column 313, the setting value of the reading setting in the selected job memories is called up. When the job memory is selected and called up in the printing setting job memory selecting column 314, the setting value of the printing setting in the selected job memories is called up. For example, when the job memory 1 is selected in the reading setting job memory selecting column 313 and at the same time when the job memory 2 is selected and called up in the printing setting job memory selecting column 314, as the job memory for carrying gout the copying processing, the setting value of "full color/A4", which is the reading setting of the job memory 1, and the setting value of "both sides/right punch", which is the printing setting of the job memory 2, are called up and by the setting in which both are combined with each other as the setting value for executing copying, the scanning processing and the printing processing can be carried out, that is, the copying processing can be carried out. Even in this embodiment, after the called setting value has been appropriately changed or after the setting value, which is not called up, has been appropriately set at a desired setting value, the start of copying processing may be directed.

Figure 9:
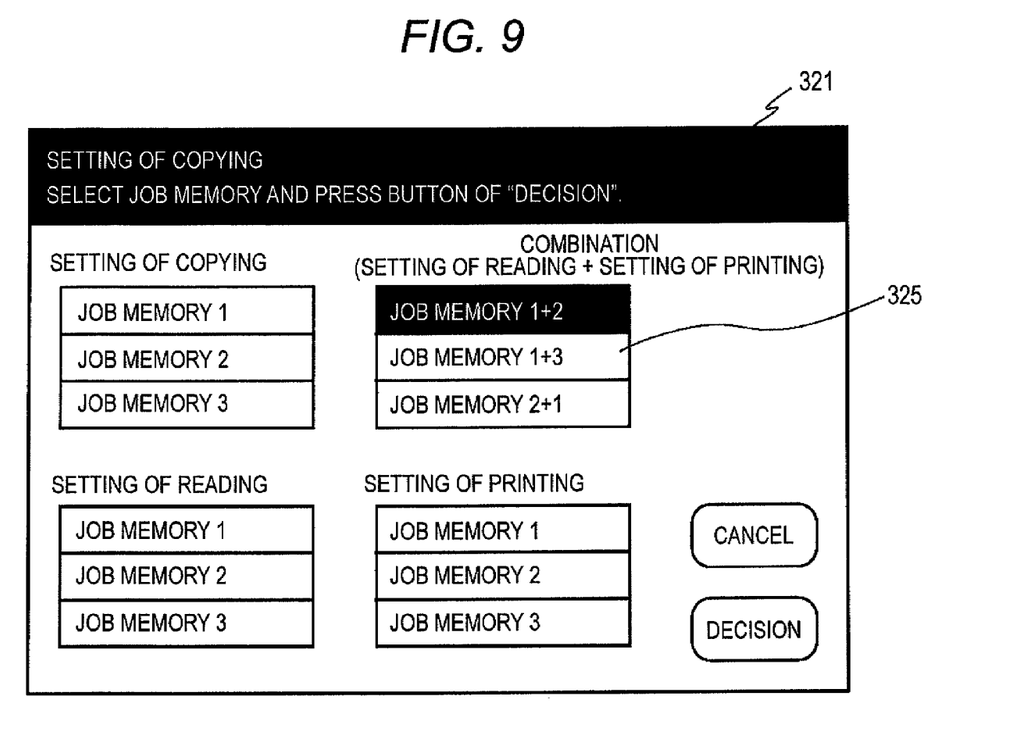
FIG. 9 is a view showing a setting display in an image processing apparatus according to an embodiment of the invention.

The image processing apparatus 1 may show the display 321 shown in FIG. 9 instead of the display 311. On this display 321, in addition to each display on the display 311, the job memory selecting column 325 for selecting the job memory at the time of calling up a combination of the reading setting and the printing setting is shown. This job memory selecting column 325 directs the same calling processing as the processing for calling the job memory by utilizing both the reading setting job memory selecting column 313 and the printing setting job memory selecting column 314. For example, when the job memory 1+2 is selected and called up, the setting value of "full color/A4", which is the reading setting value of the job memory 1 as the reading setting, and the setting value of "both sides/right punch", which is the printing setting value of the job memory 2 as the printing setting, are combined with each other and called up as the setting value for executing the copying operation.

In the above embodiment, explanations are made into a case in which the registered job memories are classified by the processing function of the image processing apparatus and the setting value is read out for each processing function. Successively, explanations will be made into a case in which the job memories are classified by the classification of other types.

Figure 10:
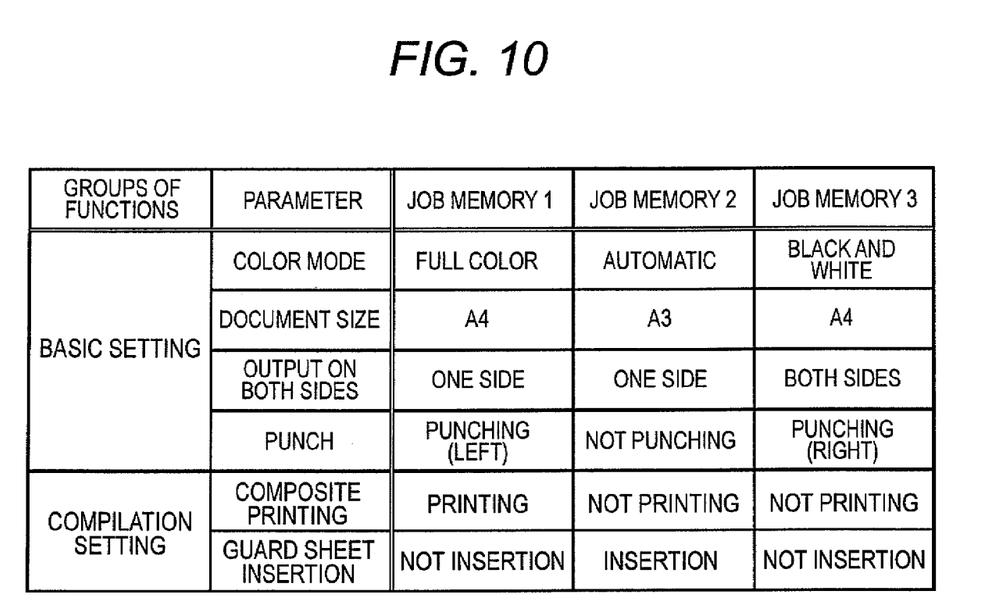
FIG. 10 is a view showing setting values of a registered job memory in an image processing apparatus according to an embodiment of the invention.

FIG. 10 is a view showing job memory setting values registered. In FIG. 10, the job memories 1, 2 and 3 are classified by the basic setting and the compilation setting which correspond to the setting classification of the setting display and the setting values are registered with respect to the respective setting items.

Figure 11:
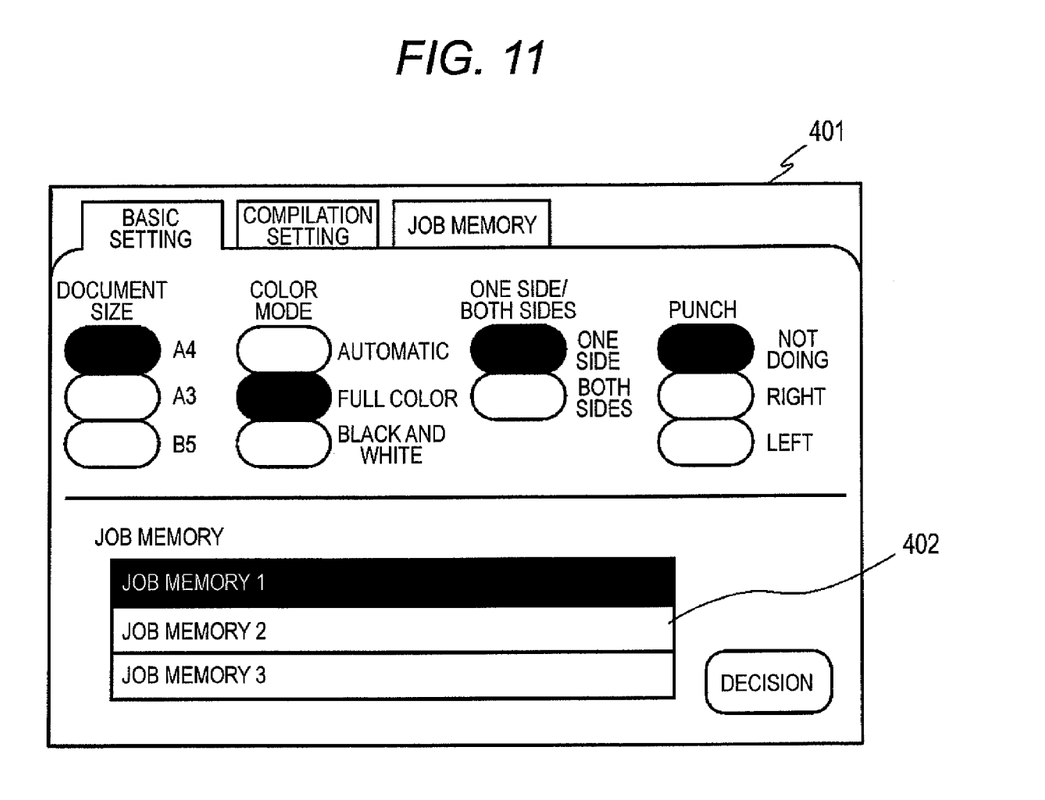
FIG. 11 is a view showing a setting display in an image processing apparatus according to an embodiment of the invention.

As the setting display for designating a condition at the time of carrying out the copying function, the image processing apparatus 1 displays the basic setting display 401 shown in FIG. 11 at the time of designating the basic setting. On the basic setting display 401, the basic setting job memory selecting column 402 is displayed which selects the job memory at the time of calling up the basic setting in the job memories.

On this basic setting display 401, when the job memory is selected and called up in the basic setting job memory selecting column 402, the setting value of the basic setting in the setting values registered as the selected job memory is called up. For example, when the job memory 1 is selected and called up in the basic setting job memory selecting column 402, the setting value of "full color/A4/one side/left punch", which is the setting value related to the basic setting, in the setting values registered as the job memory 1 is called up as the setting value of the basic setting for executing the copying operation.

Figure 12:
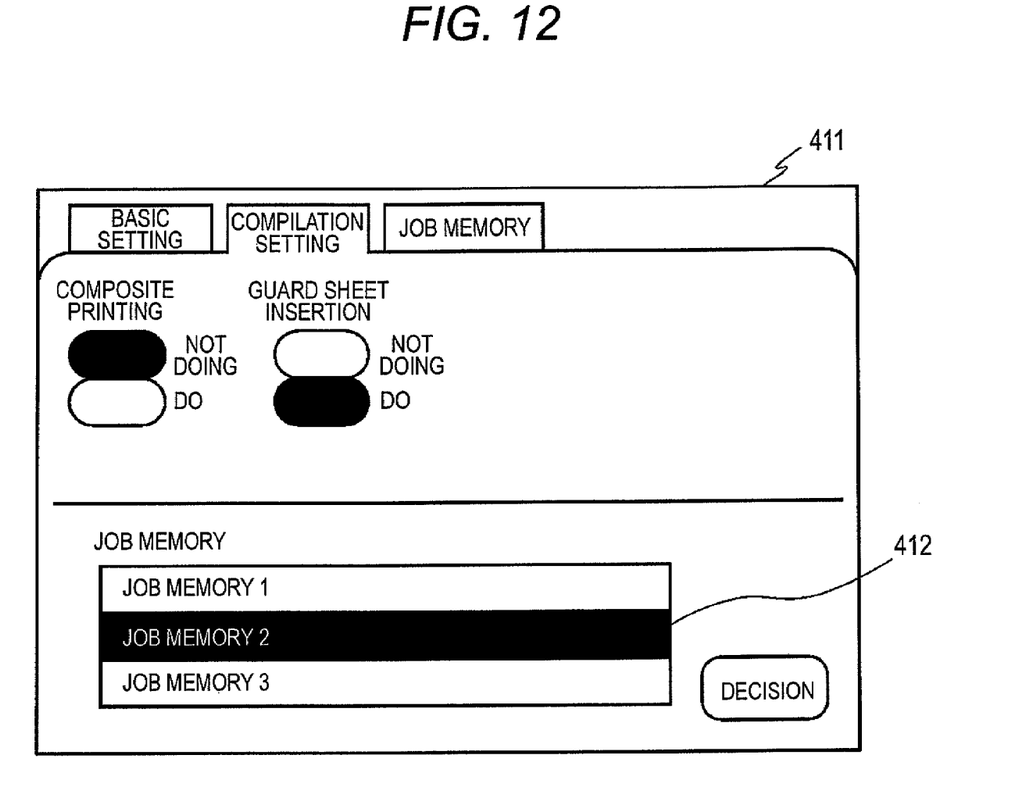
FIG. 12 is a view showing a setting display in an image processing apparatus according to an embodiment of the invention.

The image processing apparatus 1 shows the compilation setting display 411 shown in FIG. 12 at the time of designating the compilation setting as a display for designating a condition at the time of carrying out the copying function. On the compilation setting display 411, the compilation setting job memory selecting column 412 for selecting the job memory at the time of calling up the compilation setting in the job memories is displayed.

On this compilation setting display 411, when the job memory is selected and called up in the compilation setting job memory selecting column 412, the setting value of compilation setting in the setting values registered as the selected job memories is called up. For example, when the job memory 2 is selected and called up in the compilation setting job memory selecting column 412, the setting value of "no composite printing/guard sheet insertion", which is the setting value related to the compilation setting, in the setting values registered as the job memory 2 is called up as the setting value of compilation setting for executing the copying operation.

Accordingly, in the image processing apparatus 1, when the job memory 1 is called up on the basic setting display 401 and the job memory 2 is called up on the compilation setting display 411, the setting value of "full color/A4/one side/left punch" related to the basic setting in the setting values registered as the job memory 1 and the setting value of "no composite printing/guard sheet insertion" related to the compilation setting in the setting values registered as the job memory 2 are called up. Therefore, the copying processing can be carried out by the setting in which both are combined with each other as the setting value for executing the copying operation. In this embodiment, the start of copying processing may be directed after the setting value of the basic setting, which is called up, has been appropriately changed or the setting value, which is not called up, has been set as a desired setting value.

Figure 13:
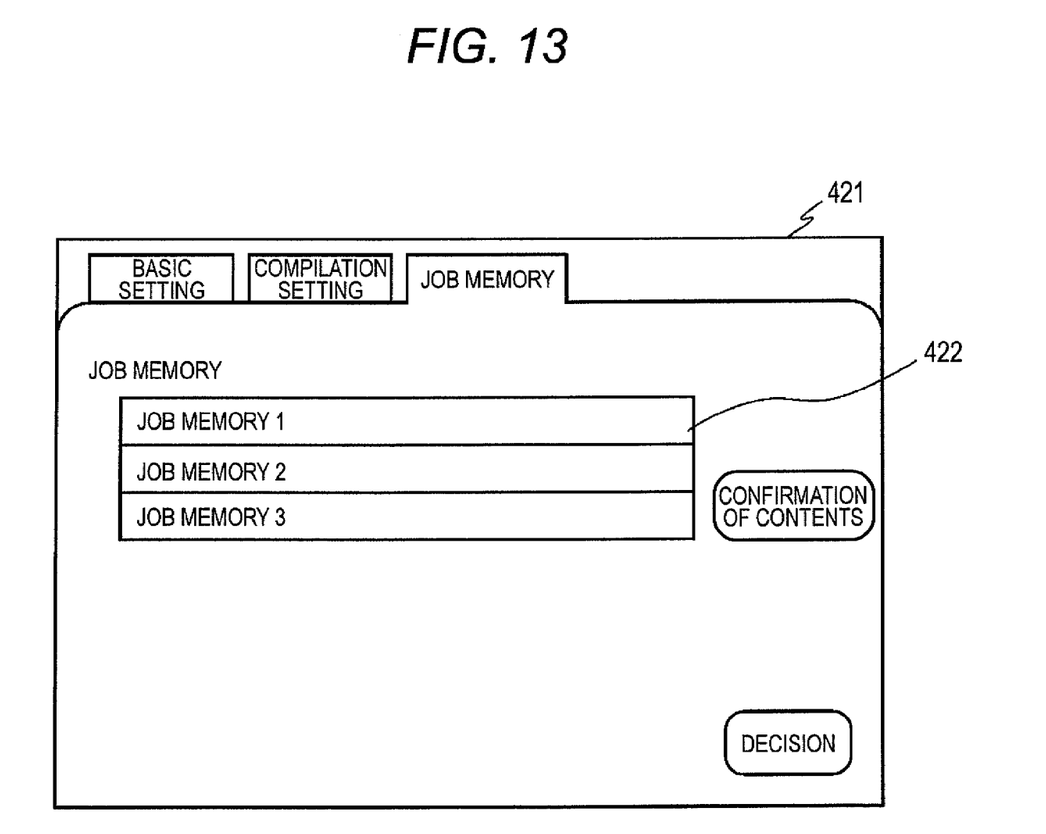
FIG. 13 is a view showing a setting display in an image processing apparatus according to an embodiment of the invention.

In the image processing apparatus 1, the display 421 shown in FIG. 13 is displayed as a display for calling up the job memory. On the display 421, the job memory selecting column 422 is displayed which selects a job memory at the time of calling up both the basic setting and the compilation setting in the job memory.

On this display 421, when the job memory is selected and called up on the job memory selecting column 422, the setting values of the basic setting and the compilation setting in the selected job memory are called up. For example, when the job memory 1 is selected and called up in the job memory selecting column 422, the setting value for executing the copying operation under the condition of "full color/A4/one side/left punch/composite printing/no guard sheet insertion" is called up.

Figure 14:
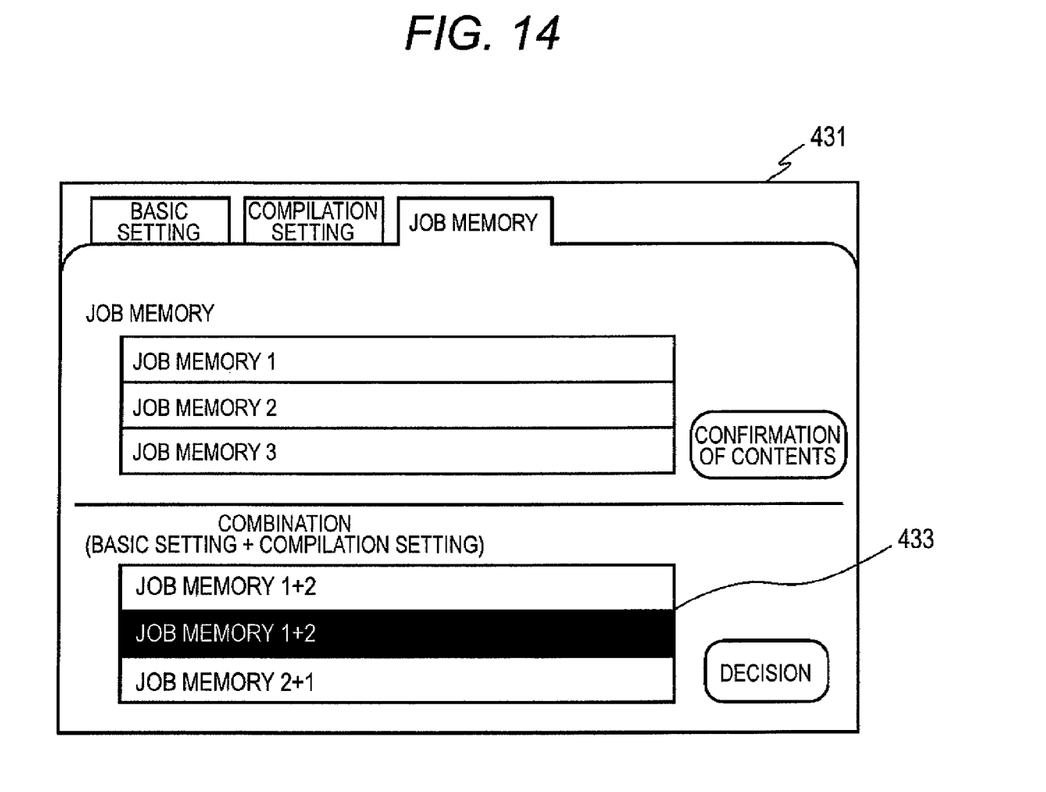
FIG. 14 is a view showing a setting display in an image processing apparatus according to an embodiment of the invention.

In the image processing apparatus 1, the display 431 shown in FIG. 14 may be displayed instead of the display 421. On this display 431, in addition to each display on the display 421, the job memory selecting column 433 is displayed which selects the job memory at the time of calling up the basic setting and the compilation setting after both have been combined with each other. This job memory selecting column 433 directs the same processing as the processing of calling up the job memory by utilizing both the job memory selecting columns 411 and 412. For example, when the job memory 1+2 is selected and called up, the setting value of "full color/A4/one side/left punch" related to the basic setting in the setting values registered as the job memory 1 and the setting value of "no composite printing/guard sheet insertion" related to the compilation setting in the setting values registered as the job memory 2 are called up. Therefore, the copying processing can be carried out by the setting in which both are combined with each other for executing the copying operation.

In this connection, in the embodiment of the present invention, the program to be carried out by CPU is accommodated in the storage portion such as ROM. However, the program to be carried out by CPU may be accommodated in HDD (Hard Disk Drive) except for ROM or in the external storage portion. Alternatively, this program may be received as a data signal from the outside through a communication line such as a network. Further, this program may be provided being accommodated in a storage medium such as DVD-ROM (Digital Versatile Disk Read Only Memory) capable of reading by a computer.

What is claimed is:

1. An image processing apparatus comprising:
a processor;
a memory that stores a plurality of setting value groups associated with respective identifiers to identify the setting value groups; and
a setting unit, executed on the processor, that sets a new setting value group by combining portions of at least two setting value groups, from among the plurality of the setting value groups, in response to receiving an instruction from a user; and
a processing unit, executed by the processor, that carries out image processing based on the new setting value group,
wherein each of the plurality of the setting value groups respectively comprises setting values for carrying out image processing functions, wherein the setting values within each of the plurality of the setting value groups are classified with respect to the image processing functions.

2. The image processing apparatus according to claim 1, further comprising:

a receiving unit, executed on the processor, which receives the instruction from the user identifying the at least two setting value groups.

3. A method for image processing, comprising:
- storing, in a memory, a plurality of setting value groups associated with respective identifiers to identify the setting value groups; and
- setting a new setting value group by combining portions of at least two setting value groups, from among the plurality of the setting value groups, in response to receiving an instruction from a user; and
- carrying out image processing based on the new setting value group,
- wherein each of the plurality of the setting value groups respectively comprises setting values for carrying out image processing functions, wherein the setting values within each of the plurality of the setting value groups are classified with respect to the image processing functions.

4. The method of claim 3, further comprising:
- receiving the instruction from the user identifying the at least two setting value groups.

5. A non-transitory computer readable medium storing a program causing a computer to execute a process for image processing, the process comprising:
- storing, in a memory, a plurality of setting value groups associated with respective identifiers to identify the setting value groups; and
- setting a new setting value group by combining portions of at least two setting value groups, from among the plurality of the setting value groups, in response to receiving an instruction from a user; and
- carrying out image processing based on the new setting value group,
- wherein each of the plurality of the setting value groups respectively comprises setting values for carrying out image processing functions, wherein the setting values within each of the plurality of the setting value groups are classified with respect to the image processing functions.

6. The non-transitory computer readable medium of claim 5, wherein the process further comprises:
- receiving the instruction from the user identifying the at least two setting value groups.

\* \* \* \* \*